US012613374B2

(12) United States Patent
Kobayashi et al.

(10) Patent No.: US 12,613,374 B2
(45) Date of Patent: Apr. 28, 2026

(54) SPOT SIZE CONVERTER

(71) Applicant: Sumitomo Electric Industries, Ltd.,
Osaka (JP)

(72) Inventors: Kunio Kobayashi, Osaka (JP);
Yasutaka Mizuno, Osaka (JP)

(73) Assignee: **SUMITOMO ELECTRIC
INDUSTRIES, LTD.,** Osaka (JP)

( * ) Notice: Subject to any disclaimer, the term of this
patent is extended or adjusted under 35
U.S.C. 154(b) by 254 days.

(21) Appl. No.: 18/242,664

(22) Filed: Sep. 6, 2023

(65) Prior Publication Data

US 2024/0111097 A1    Apr. 4, 2024

(30) Foreign Application Priority Data

Oct. 3, 2022    (JP) ................................. 2022-159625

(51) Int. Cl.
*G02B 6/122*        (2006.01)
*G02B 6/12*         (2006.01)

(52) U.S. Cl.
CPC .. *G02B 6/1228* (2013.01); *G02B 2006/12061*
(2013.01); *G02B 2006/12121* (2013.01); *G02B
2006/12152* (2013.01)

(58) Field of Classification Search
CPC .................................................... G02B 6/1228
See application file for complete search history.

(56) References Cited

U.S. PATENT DOCUMENTS

| | | | |
|---|---|---|---|
| 2004/0202429 A1* | 10/2004 | Margalit ................ | B82Y 20/00 |
| | | | 430/321 |
| 2008/0001322 A1 | 1/2008 | Uchiyama et al. | |
| 2016/0085026 A1* | 3/2016 | Yamasaki ............ | G02B 6/1228 |
| | | | 385/43 |
| 2019/0170941 A1* | 6/2019 | Mahgerefteh ........ | G02B 6/1228 |
| 2020/0081202 A1* | 3/2020 | Thompson .............. | G02B 6/42 |

(Continued)

FOREIGN PATENT DOCUMENTS

| | | | |
|---|---|---|---|
| DE | 10123137 C1 * | 10/2002 | ........... G02B 6/1228 |
| JP | 2004-184896 A | 7/2004 | |
| WO | 2014203568 A1 | 12/2014 | |

OTHER PUBLICATIONS

Takeshi Matsumoto et. al. "Hybrid-Integration of SOA on Silicon
Photonics Platform Based on Flip-Chip Bonding" Journal of Light-
wave Technology, vol. 37, No. 2, 307-313 (2019).

(Continued)

*Primary Examiner* — Charlie Y Peng
(74) *Attorney, Agent, or Firm* — Volpe Koenig

(57)                ABSTRACT
A spot size converter includes a first optical waveguide, and
a second optical waveguide. The first optical waveguide has
a first tapered portion. The first tapered portion extends in a
direction in which the first optical waveguide extends, and
is thicker with decreasing distance from an end portion of
the first optical waveguide and is thinner with decreasing
distance from the second optical waveguide. The second
optical waveguide is separated from the first tapered portion
and has a second tapered portion. The second tapered
portion extends in a direction in which the second optical
waveguide extends, and is thinner with decreasing distance
from the first tapered portion and is thicker with increasing
distance from the first tapered portion.

10 Claims, 13 Drawing Sheets

(56) References Cited

U.S. PATENT DOCUMENTS

2022/0334309 A1* 10/2022 Kurata ............... G02B 6/12014

OTHER PUBLICATIONS

Kazuya Ohira et. al. "On-chip-optical interconnection by using integrated III-V laser diode and photodetector with silicon waveguide" Optics Express, vol. 18, No. 15, 15440-15447 (2010).
Tai Tsuchizawa et. al. "Microphotonics Devices Based on Silicon Microfabrication Technology" IEEE Journal of Selected Topics in Quantum Electronics, vol. 11, No. 1, 232-240 (2005).

* cited by examiner

SPOT SIZE CONVERTER

CROSS REFERENCE TO RELATED APPLICATIONS

This application claims priority based on Japanese Patent Application No. 2022-159625 filed on Oct. 3, 2022, and the entire contents of the Japanese patent application are incorporated herein by reference.

TECHNICAL FIELD

The present disclosure relates to a spot size converter.

BACKGROUND

A light emitting device such as a laser diode and an optical waveguide may be integrated into a single device. The spot size of the light is converted by a spot size converter, and the light is propagated to the optical waveguide (PTL 1, Non-PTL 1, Non-PTL 2, Non-PTL 3, etc.).

PTL 1: Japanese Unexamined Patent Application Publication No. 2004-184986

Non-PTL 1: Takeshi Matsumoto et. al. "Hybrid-Integration of SOA on Silicon Photonics Platform Based on Flip-Chip Bonding" JOURNAL OF LIGHTWAVE TECHNOLOGY, Vol. 37, No. 2, 307-313 (2019)

Non-PTL 2: Kazuya Ohira et. al. "On-chip-optical interconnection by using integrated III-V laser diode and photodetector with silicon waveguide" OPTICS EXPRESS, Vol. 18, No. 15, 15440-15447 (2010)

Non-PTL 3: Tai Tsuchizawa et. al. "Microphotonics Devices Based on Silicon Microfabrication Technology" IEEE JOURNAL OF SELECTED TOPICS IN QUANTUM ELECTRONICS, Vol. 11, No. 1, 232-240 (2005)

SUMMARY

A spot size converter according to the present disclosure includes a first optical waveguide, and a second optical waveguide. The first optical waveguide has a first tapered portion. The first tapered portion extends in a direction in which the first optical waveguide extends, and is thicker with decreasing distance from an end portion of the first optical waveguide and is thinner with decreasing distance from the second optical waveguide. The second optical waveguide is separated from the first tapered portion and has a second tapered portion. The second tapered portion extends in a direction in which the second optical waveguide extends, and is thinner with decreasing distance from the first tapered portion and is thicker with increasing distance from the first tapered portion.

DETAILED DESCRIPTION

Figure 1:
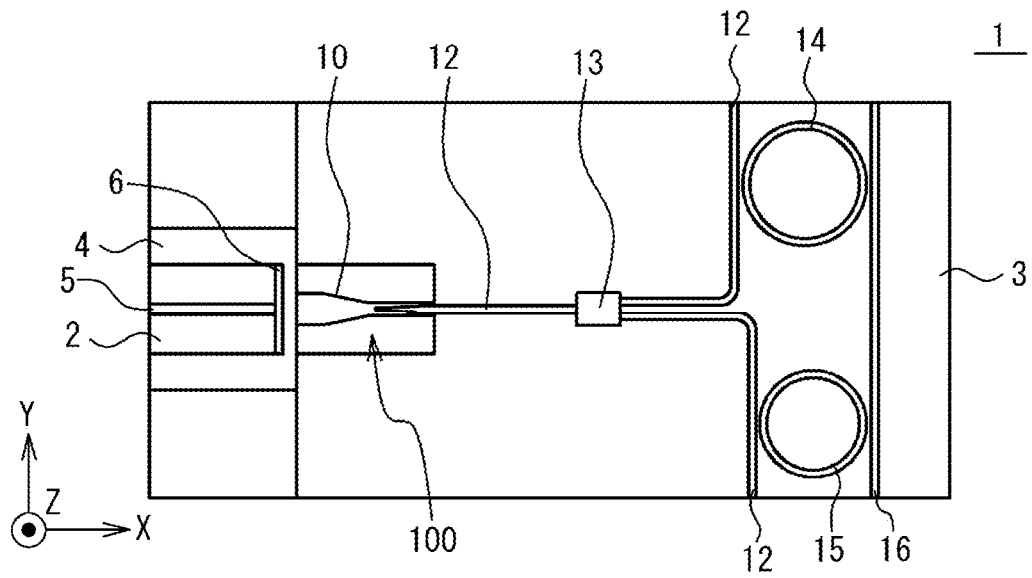
FIG. 1 is a plan view illustrating an optical apparatus.

Due to the positional displacement between the light emitting device and the spot size converter, coupling efficiency is reduced. The tolerance for positional displacement can be improved by increasing the width of the tip of the spot size converter. However, a higher-order mode is generated in the spot size converter, and a change in coupling efficiency becomes large. It is therefore an object to provide a spot size converter capable of improving tolerance for positional displacement and suppressing a change in coupling efficiency.

DESCRIPTION OF EMBODIMENTS OF PRESENT DISCLOSURE

First, the contents of embodiments of the present disclosure will be listed and explained.

According to one aspect of the present disclosure, (1) a spot size converter includes a first optical waveguide, and a second optical waveguide. The first optical waveguide has a first tapered portion. The first tapered portion extends in a direction in which the first optical waveguide extends, and is thicker with decreasing distance from an end portion of the first optical waveguide and is thinner with decreasing distance from the second optical waveguide. The second optical waveguide is separated from the first tapered portion and has a second tapered portion. The second tapered portion extends in a direction in which the second optical waveguide extends, and is thinner with decreasing distance from the first tapered portion and is thicker with increasing distance from the first tapered portion. Since the first optical waveguide has the first tapered portion, interference between the higher-order mode and the fundamental mode is suppressed. Light is made incident on the first optical waveguide from an external light emitting device. A change in coupling efficiency between the light emitting device and the second optical waveguide is suppressed. The first optical waveguide is thick at a portion closer to the end portion. Tolerance for positional displacement between the light emitting device and the spot size converter is improved.

(2) In the above (1), the first optical waveguide may have a first portion and a second portion. The first portion may be thicker than the second portion. The first tapered portion may be positioned between the first portion and the second portion. The first portion may have the end portion of the first optical waveguide. The second portion may overlap the second optical waveguide. Since the first portion is thick, tolerance for positional displacement is improved.

(3) In the above (1) or (2), a length of the first tapered portion may be 100 μm or more. The amount of change in coupling efficiency is suppressed to 1.0 dB or less.

(4) In any one of the above (1) to (3), a length of the first tapered portion may be 200 μm or more. The amount of change in coupling efficiency is suppressed.

(5) In any one of the above (1) to (4), a thickness of the first tapered portion closer to the second optical waveguide may be smaller than or equal to half of a thickness of the first tapered portion closer to the end portion of the first optical waveguide. Since the portion closer to the end portion of the first optical waveguide is thick, the tolerance for positional displacement can be improved. Since the first optical waveguide has the first tapered portion, it is possible to suppress interference between the higher-order mode and the fundamental mode and to suppress a change in coupling efficiency.

(6) In any one of the above (1) to (5), a thickness of the end portion of the first optical waveguide may be 6 μm or more. Tolerance is improved.

(7) In any one of the above (1) to (6), the spot size converter may include a first layer formed of a dielectric, and a second layer embedded in the first layer and formed of silicon. The first layer may have the first optical waveguide. The second layer may have the second optical waveguide. Light is transferred between the first optical waveguide of the first layer and the second optical waveguide of the second layer.

(8) In the above (7), the spot size converter may include a third layer provided over the second layer. A refractive index of the first layer may be higher than a refractive index of the third layer. Light can be propagated to the first optical waveguide of the first layer.

(9) In any one of the above (1) to (8), a width of the first tapered portion may be wider with the decreasing distance from the end portion of the first optical waveguide and may be narrower with the decreasing distance from the second optical waveguide. A width of the second tapered portion may be narrower with the decreasing distance from the first tapered portion and may be wider with the increasing distance from the first tapered portion. The tolerance for positional displacement in the horizontal direction between the light emitting device and the spot size converter can be improved.

(10) In any one of the above (1) to (9), a thickness of the first tapered portion may be larger with the decreasing distance from the end portion of the first optical waveguide and may be smaller with the decreasing distance from the second optical waveguide. A thickness of the second tapered portion may be smaller with the decreasing distance from the first tapered portion and may be larger with the increasing distance from the first tapered portion. The tolerance for positional displacement in the vertical direction between the light emitting device and the spot size converter can be improved.

(11) In any one of the above (1) to (10), the direction in which the first optical waveguide extends may be parallel to the direction in which the second optical waveguide extends. Light is transferred between the first waveguide and the second optical waveguide parallel to each other.

Details of Embodiments of Present Disclosure

Specific examples of spot size converters according to embodiments of the present disclosure will be described below with reference to the drawings. The present disclosure is not limited to these examples, and is defined by the scope of the claims, and is intended to include all modifications within the meaning and scope equivalent to the scope of the claims.

First Embodiment

FIG. 1 is a plan view illustrating an optical apparatus 1. Optical apparatus 1 is an apparatus in which a laser device, a spot size converter, and an optical waveguide are integrated. Optical apparatus 1 includes a semiconductor laser device 2 and a substrate 3. Substrate 3 is, for example, a Silicon on Insulator (SOI) substrate. The upper surface of substrate 3 is parallel to the XY plane. Two sides of substrate 3 are parallel to the X-axis. The other two sides of substrate 3 are parallel to the Y-axis. The Z-axis represents the normal direction of the upper surface of substrate 3. The X-axis direction, the Y-axis direction, and the Z-axis direction are orthogonal to each other.

Substrate 3 includes a spot size converter 100, an optical waveguide 10 (first optical waveguide), an optical waveguide 12 (second optical waveguide), ring resonators 14 and 15, and an optical waveguide 16. Optical waveguide 10 and optical waveguide 12 extend parallel to the X-axis direction. Optical waveguide 10 extends from an end portion of substrate 3 facing a recess 4. A portion of optical waveguide 12 overlaps optical waveguide 10. In a coupler 13, optical waveguide 12 is branched into two. Optical waveguide 16 is provided at a position separated from optical waveguide 12. Ring resonator 14 is positioned between one of two optical waveguides 12 and optical waveguide 16 and is coupled to one optical waveguide 12 and optical waveguide 16. Ring resonator 15 is positioned between the other one of two optical waveguides 12 and optical waveguide 16, and is coupled to the other one of optical waveguide 12 and optical waveguide 16. The radius of ring resonator 14 is larger than the radius of ring resonator 15. The ring resonator may be provided with a heater electrode or the like. Spot size converter 100 will be described later.

Semiconductor laser device 2 is an example of a light emitting device. Semiconductor laser device 2 is formed of a semiconductor such as indium phosphide (InP) and indium gallium arsenide (InGaAs). Semiconductor laser device 2 may be a laser diode integrated with a semiconductor optical amplifiers (SOA). Semiconductor laser device 2 has a mesa 5. Mesa 5 includes an active layer and the like, and functions as a light waveguide. An antireflection film 6 is provided at an end portion of semiconductor laser device 2 facing optical waveguide 10. The wavelength of the light emitted from semiconductor laser device 2 is, for example, 1310 nm. The mode field diameter (MFD) is, for example, 3 μm.

Semiconductor laser device 2 is disposed in recess 4. The end portion of semiconductor laser device 2 faces an end portion 10a of optical waveguide 10. The light emitted from semiconductor laser device 2 is made incident on optical waveguide 10. The spot size of the light is converted in spot size converter 100, and the light is transferred from optical waveguide 10 to optical waveguide 12. The wavelength of the light is controlled by ring resonators 14 and 15. Semiconductor laser device 2 and substrate 3 form a laser resonator. The laser light is emitted to the outside of optical apparatus 1.

(Spot Size Converter)

Figure 2A:
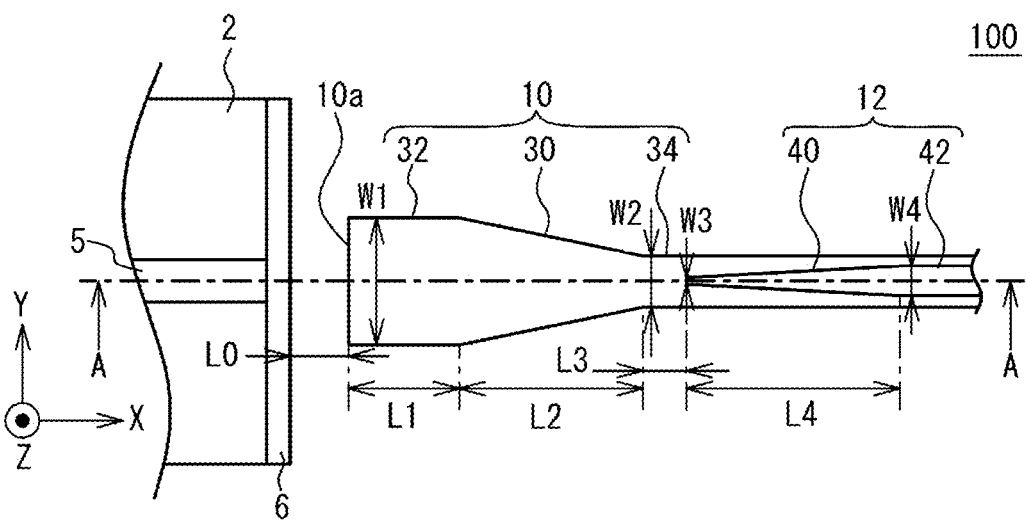
FIG. 2A is a plan view illustrating a spot size converter according to a first embodiment.
Figure 2B:
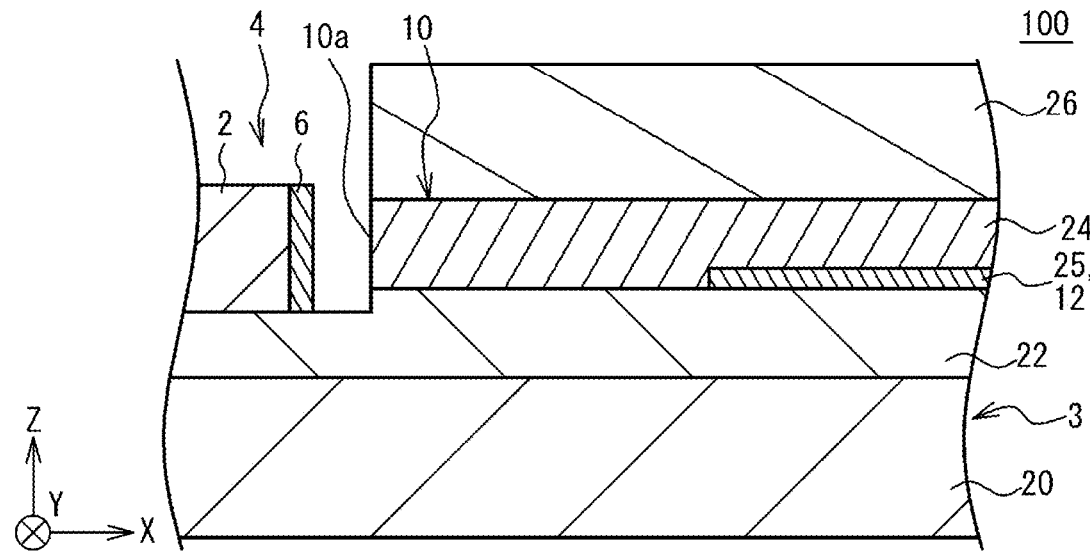
FIG. 2B is a cross-sectional view taken along line A-A of FIG. 2A.

FIG. 2A is a plan view illustrating spot size converter 100 according to a first embodiment. FIG. 2B is a cross-sectional view taken along line A-A of FIG. 2A. As shown in FIG. 2B, substrate 3 includes a substrate 20, a box layer 22, a core layer 24 (first layer), a silicon layer 25 (second layer), and a cladding layer 26 (third layer).

Box layer 22 is provided on one surface of substrate 20. Core layer 24 is provided on one surface of box layer 22. Core layer 24 has optical waveguide 10. In a cross section of substrate 3 taken along a plane passing through optical waveguide 10, optical waveguide 10 is separated from portions of core layer 24 other than optical waveguide 10. Cladding layer 26 is provided over the upper surfaces of box layer 22 and core layer 24. Core layer 24 is embedded in cladding layer 26. In the cross section of substrate 3 along optical waveguide 12, silicon layer 25 is provided in contact with the upper surface of box layer 22 and is embedded in core layer 24. Silicon layer 25 has optical waveguide 12. The upper and side surfaces of optical waveguide 12 are covered with core layer 24.

Substrate 20 is formed of, for example, silicon (Si). Box layer 22 is formed of, for example, 3 μm thick silicon oxide (SiO$_2$). Core layer 24 is formed of a dielectric material that is transparent at the wavelength of light guided through core layer 24, and is formed of, for example, a polymer. Core layer 24 may be formed of a silicon compound such as silicon oxide, silicon nitride, or silicon oxynitride. Silicon layer 25 is formed of Si. Cladding layer 26 is formed of a dielectric material and may be formed of, for example, a SiO$_2$ or a polymer. The refractive index of core layer 24 is higher than the refractive index of box layer 22 and the refractive index of cladding layer 26, and is, for example, 1.50.

As shown in FIG. 2A, spot size converter 100 is formed of optical waveguide 10 and optical waveguide 12. Optical waveguide 10 has a tapered portion 30, a first portion 32 and a second portion 34. First portion 32, tapered portion 30 (first tapered portion), and second portion 34 are arranged in this order along the X-axis direction. First portion 32 faces semiconductor laser device 2. End portion 10a of first portion 32 serves as an incident port. Second portion 34 overlaps optical waveguide 12. The planar shape of each of first portion 32 and second portion 34 is linear. Tapered portion 30 is positioned between first portion 32 and second portion 34. Tapered portion 30 is thicker with decreasing distance from end portion 10a of optical waveguide 10 and thinner with decreasing distance from optical waveguide 12.

Optical waveguide 12 is separated from first portion 32 and tapered portion 30 of optical waveguide 10 and is embedded in second portion 34. Optical waveguide 12 has a tapered portion 40 (second tapered portion) and a portion 42. Tapered portion 40 and portion 42 are arranged in this order along the X-axis direction. Tapered portion 40 is thinner with decreasing distance from optical waveguide 10 and thicker with increasing distance from optical 10.

Distance L0 between semiconductor laser device 2 and the end portion of first portion 32 is, for example, 3 μm. Length L1 of first portion 32 of optical waveguide 10 in the X-axis direction is, for example, several tens of μm or several hundreds of μm. For example, a silicon wafer is diced to form substrate 3. Errors of several tens of μm, for example, occur in length L1 depending on the accuracy of dicing. Length L2 of tapered portion 30 is, for example, from 100 μm to 500 μm. Width W1 of first portion 32 in the Y-axis direction is, for example, 8 μm. Width W2 of second portion 34 is, for example, 3 μm. The width of tapered portion 30 from first portion 32 to second portion 34 varies from 8 μm to 3 μm.

Distance L3 from the end portion of tapered portion 30 of optical waveguide 10 to the end portion of tapered portion 40 of optical waveguide 12 is, for example, 10 μm. Length L4 of tapered portion 40 of optical waveguide 12 is, for example, 300 μm. Width W3 of the end portion of tapered portion 40 facing tapered portion 30 is narrower than width W2 of second portion 34, for example, narrower than or equal to ¼ of width W2. Width W4 of portion 42 of optical waveguide 12 is wider than width W3 and narrower than width W2, for example, five times width W3. The width of tapered portion 30 varies from width W3 to width W4.

As shown in FIG. 2B, recess 4 is provided in box layer 22. Semiconductor laser device 2 is disposed in recess 4. Core layer 24 is provided on the upper surface of box layer 22 on the outer surface of recess 4. Optical waveguide 10 is formed in core layer 24. Optical waveguide 12 is provided on the upper surface of box layer 22 at a position separated from semiconductor laser device 2, the first portion of optical waveguide 10, and tapered portion 30. Cladding layer 26 is provided over the upper surface of box layer 22.

Figure 3:
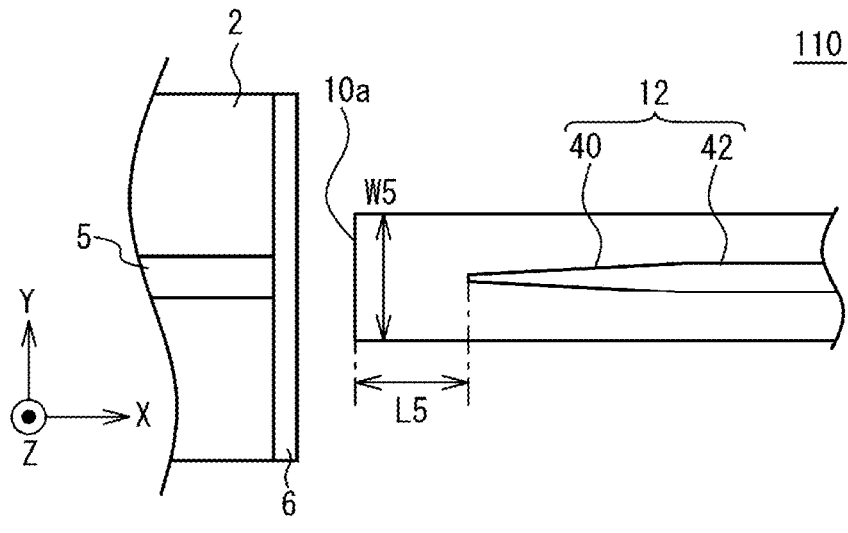
FIG. 3 is a plan view illustrating a spot size converter according to a comparative example.

FIG. 3 is a plan view illustrating a spot size converter 110 according to a comparative example. Optical waveguide 10 of spot size converter 110 does not have a tapered portion. The width of optical waveguide 10, which is constant, is W5. The length from end portion 10a of optical waveguide 10 to the end portion of optical waveguide 12 is defined as L5.

Figure 4A:
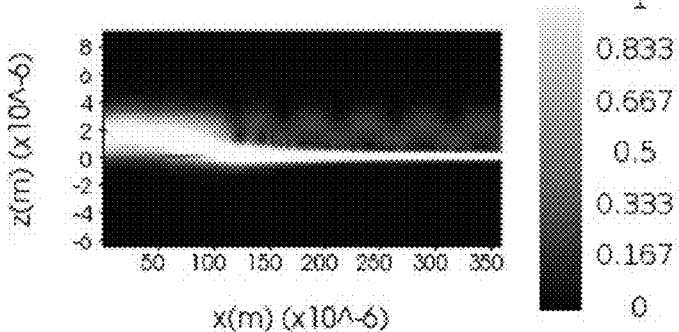
FIG. 4A illustrates the distribution of light.
Figure 4B:
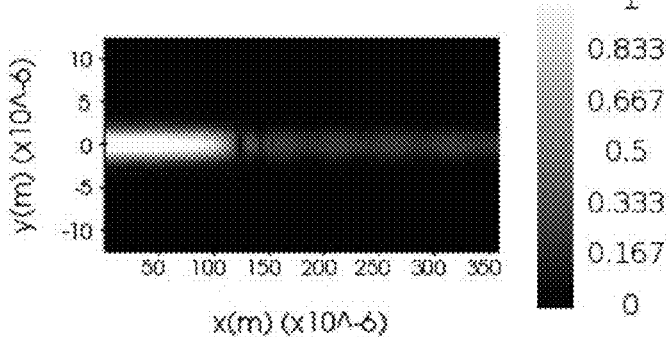
FIG. 4B illustrates the distribution of light.
Figure 4C:
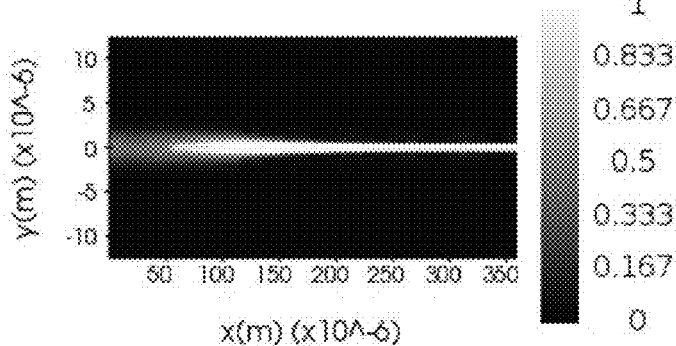
FIG. 4C illustrates the distribution of light.
Figure 5A:
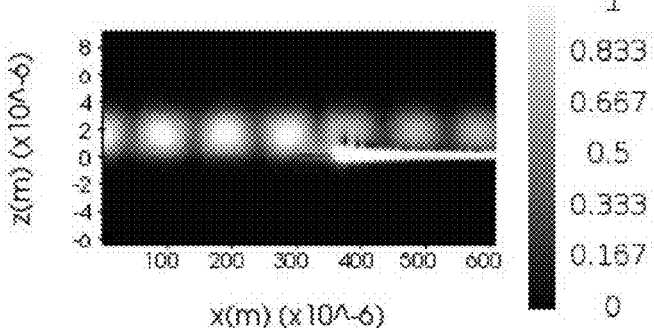
FIG. 5A illustrates the distribution of light.
Figure 5B:
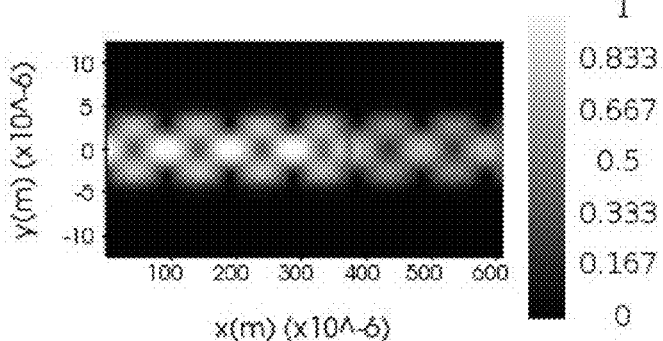
FIG. 5B illustrates the distribution of light.
Figure 5C:
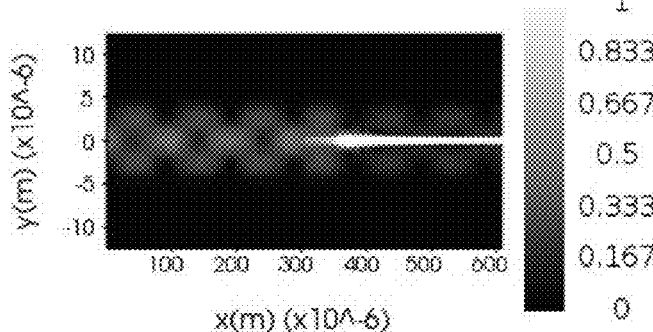
FIG. 5C illustrates the distribution of light.
Figure 6A:
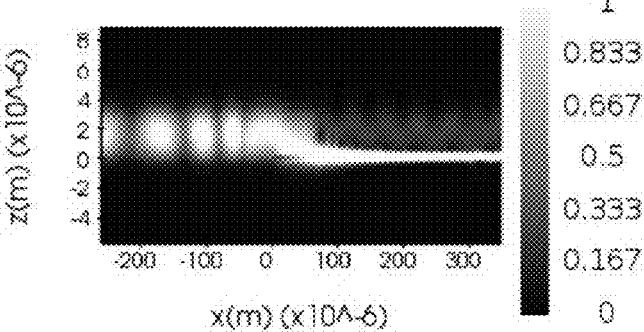
FIG. 6A illustrates the distribution of light.
Figure 6B:
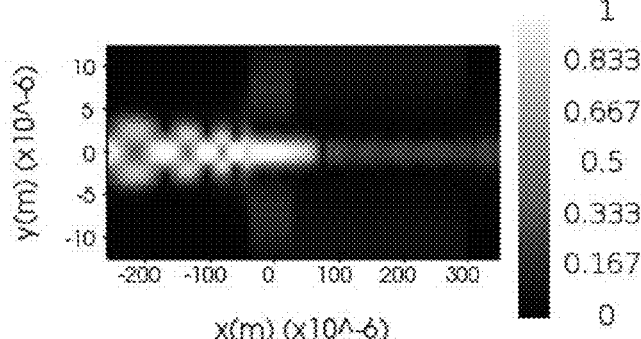
FIG. 6B illustrates the distribution of light.
Figure 6C:
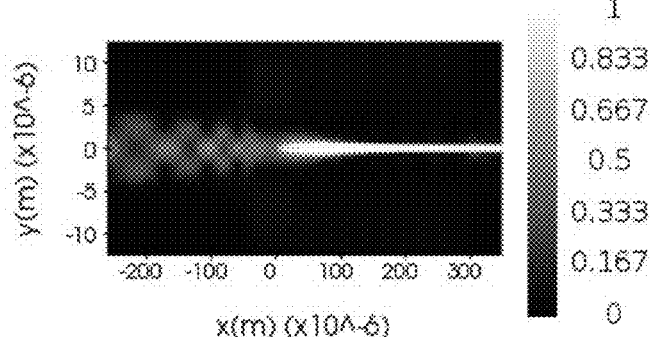
FIG. 6C illustrates the distribution of light.

FIGS. 4A to 6C illustrate the distribution of light, which is the result of calculating the propagation of light in an optical waveguide. FIGS. 4A, 5A, and 6A illustrate the distribution of light in a cross section of a spot size converter as shown in FIG. 2B. Z in the drawing represents a position in the Z-axis direction. X represents a position in the X-axis direction. FIGS. 4B, 5B, and 6B illustrate the distribution of light in optical waveguide 10. FIGS. 4C, 5C and 6C illustrate the distribution of light in optical waveguide 12. Yin the drawing represents a position in the Y-axis direction. In all of the examples of FIGS. 4A to 6C, the thickness of optical waveguide 10 is constant.

In the example of FIGS. 4A to 4C, width W5 of optical waveguide 10 in the embodiment of FIG. 3 is 3 μm. Light is made incident on optical waveguide 10 and is transferred to optical waveguide 12. As shown in FIGS. 4A and 4B, the light in optical waveguide 10 is reduced by the transfer of light to optical waveguide 12. As will be described later, since width W5 of optical waveguide 10 is small, it is difficult to perform alignment with semiconductor laser device 2.

In the example of FIGS. 5A to 5C, width W5 of optical waveguide 10 in the embodiment of FIG. 3 is 8 μm. Light is made incident on optical waveguide 10 and is transferred to optical waveguide 12. However, light is also distributed in optical waveguide 10. Since width W5 is wider than width W5 of the example shown in FIG. 4A or the like, a higher-order mode of light is generated in optical waveguide 10. Due to the interference between the fundamental mode and the higher-order mode, the effective refractive index periodically changes along the propagation direction of light. As the refractive index changes, the coupling efficiency also changes. As shown in FIGS. 5A and 5B, a portion of the light is not transferred to optical waveguide 12 but is distributed to optical waveguide 10.

In the example of FIGS. 6A to 6C, the spot size converter has the form of FIGS. 2A and 2B. Width W1 of optical waveguide 10 is 8 and width W2 is 3 μm. Length L2 of tapered portion 30 is 200 μm. Light is made incident on optical waveguide 10 and is transferred to optical waveguide 12. Since optical waveguide 12 has tapered portion 30, interference between the higher-order mode and the fundamental mode is suppressed. By suppressing the interference, a change in coupling efficiency between optical waveguide 10 and optical waveguide 12 is suppressed. Light can be transferred to optical waveguide 12.

Figure 7A:
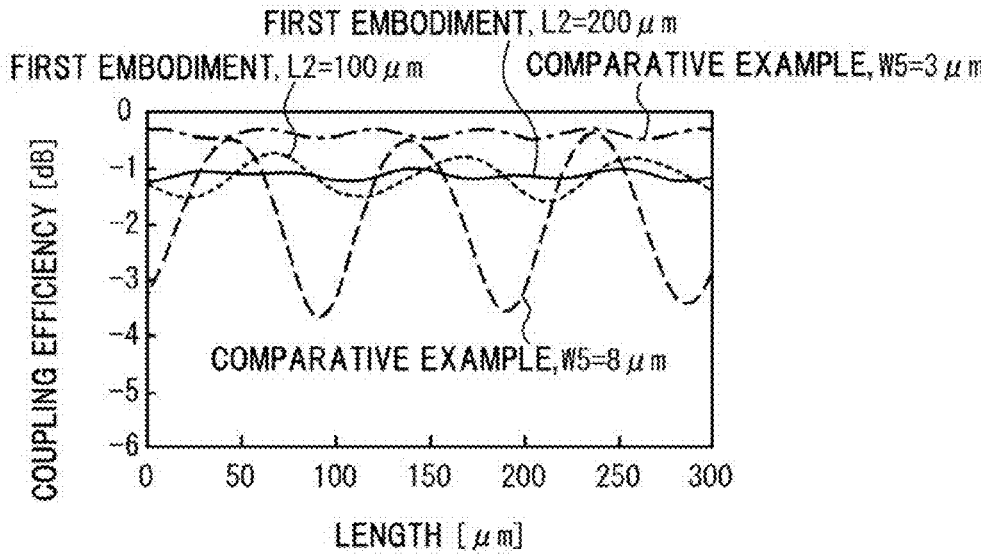
FIG. 7A illustrates a simulation of coupling efficiency.

FIG. 7A illustrates a simulation of coupling efficiency. The horizontal axis represents the length of optical waveguide 10. The length in the first embodiment represents length L1 of first portion 32. The length in the comparative example represents length L5 from end portion 10a of optical waveguide 10 to optical waveguide 12. The vertical axis represents the coupling efficiency between semiconductor laser device 2 and optical waveguide 12 when light is incident from semiconductor laser device 2 to the center of optical waveguide 10. The one dot chain line is an example in which width W5 of optical waveguide 10 is set to 3 μm in the comparative example. The dashed line is an example in which width W5 of optical waveguide 10 is set to 8 μm in the comparative example. The dotted line is an example in which length L2 of tapered portion 30 is 100 μm in the first embodiment. The solid line is an example in which length L2 of tapered portion 30 is set to 200 μm in the first embodiment.

As shown in FIG. 7A, the coupling efficiency varies periodically according to the length of optical waveguide 10. In the example of the one dot chain line, the coupling efficiency is around −0.5 dB, and the amount of change is small. However, since width W5 of optical waveguide 10 is 3 μm, is difficult to perform alignment with semiconductor laser device 2. In the example of the dashed line, width W5 is 8 μm. Alignment is easy. However, as indicated by the dashed line in FIG. 7A, the coupling efficiency varies between −3.5 dB and −0.5 dB. This is because interference occurs between the higher-order mode and the fundamental mode. In the first embodiment, the change of the coupling efficiency is suppressed. This is because interference between the higher-order mode and the fundamental mode is unlikely to occur. In the example of dotted lines in FIG. 7A, the amount of change in coupling efficiency is about 1 dB. In an example of a solid line, the amount of change in coupling efficiency is 0.5 dB or less. That is, as tapered portion 30 is lengthened, a change in coupling efficiency can be suppressed.

Figure 7B:
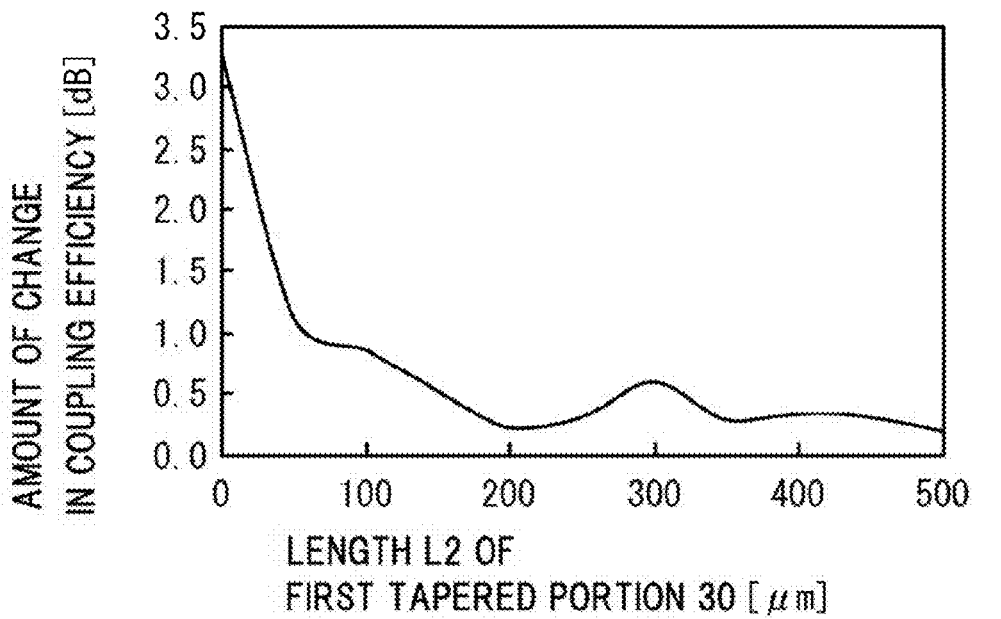
FIG. 7B illustrates the amount of change in coupling efficiency.

FIG. 7B illustrates the amount of change in coupling efficiency. The horizontal axis represents length L2 of tapered portion 30. The vertical axis represents the amount of change in coupling efficiency. The amount of change is the difference between the maximum and minimum values of the coupling efficiency in FIG. 7A. As shown in FIG. 7B, when length L2 of tapered portion 30 ranges from 0 to about 200 μm, as the length of tapered portion 30 increases, the amount of change in coupling efficiency decreases. When length L2 of tapered portion 30 is 100 the amount of change in coupling efficiency is approximately 1.0 dB. When length L2 of tapered portion 30 is 200 μm, the amount of change in coupling efficiency is 0.5 dB or less. Even when length L2 of tapered portion 30 ranges from 350 μm to 500 μm, the amount of change in coupling efficiency is suppressed to about 0.5 dB. When length L2 of tapered portion 30 is 200 μm or more, the amount of change in coupling efficiency is stabilized at a small value.

Figure 8:
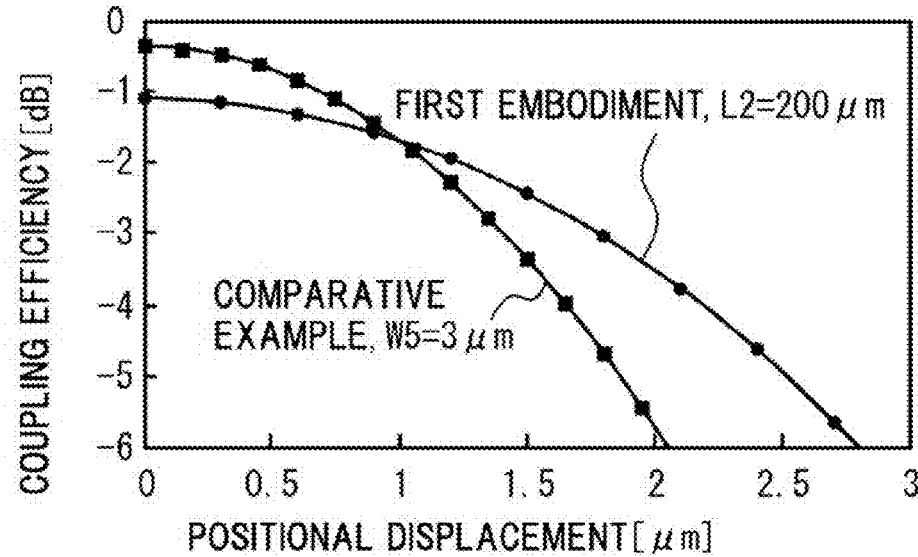
FIG. 8 illustrates a simulation of coupling efficiency.

FIG. 8 illustrates a simulation of coupling efficiency. The horizontal axis represents the positional displacement between optical waveguide 10 and semiconductor laser device 2 of the spot size converter. When the positional displacement is 0, end portion 10a of optical waveguide 10 and the end portion of semiconductor laser device 2 face each other at the front. When the positional displacement is more than 0, end portion 10a of optical waveguide 10 and the end portion of semiconductor laser device 2 are displaced from each other in the Y-axis direction. The vertical axis of FIG. 8 represents the coupling efficiency between the spot size converter and semiconductor laser device 2. The squares in FIG. 8 represent comparative examples. Width W5 of optical waveguide 10 is set to 3 The circles in FIG. 8 represent the first embodiment. Length L2 of tapered portion 30 of optical waveguide 10 is set to 200 μm.

As shown in FIG. 8, when the positional displacement is 0 in the comparative example, the coupling efficiency is about 0.5 dB. As the positional displacement increases, the coupling efficiency decreases. When the positional displacement is about 2 μm, the coupling efficiency is −5 dB or less. When the positional displacement is 0 in the first embodiment, the coupling efficiency is about −1 dB. Compared to the comparative example, the rate of change of the coupling efficiency in the first embodiment is small. That is, in the first embodiment, the coupling efficiency is less likely to decrease. For example, when the positional displacement is about 2 the coupling efficiency is about −3 dB. The tolerance for positional displacement is improved in the first embodiment compared to the comparative example.

According to the first embodiment, as shown in FIG. 2A, spot size converter 100 includes optical waveguide 10 and optical waveguide 12. Optical waveguide 10 has tapered portion 30. Tapered portion 30 is thicker with decreasing distance from end portion 10a of optical waveguide 10 and thinner with decreasing distance from optical waveguide 12. Optical waveguide 12 is separated from tapered portion 30 and has tapered portion 40. Tapered portion 40 is thinner with decreasing distance from tapered portion 30 of optical waveguide 10 and thicker with increasing distance from tapered portion 30. Since optical waveguide 10 has tapered portion 30, interference between the higher-order mode and the fundamental mode is suppressed. As shown in FIGS. 7A and 7B, a change in the coupling efficiency between the light incident on optical waveguide 10 from semiconductor laser device 2 and optical waveguide 12 is suppressed. Light can be transferred between optical waveguide 10 and optical waveguide 12. Optical waveguide 10 is thick at a portion close to end portion 10a. In particular, width W1 of the end portion of optical waveguide 10 facing semiconductor laser device 2 is wider than width W2. As shown in FIG. 8, the tolerance for positional displacement between spot size converter 100 and semiconductor laser device 2 can be improved.

Tapered portion 30 and tapered portion 40 in the first embodiment are portions in which the width in the Y-axis direction changes. The width of tapered portion 30 of optical waveguide 10 is wider with the decreasing distance from end portion 10a of optical waveguide 10 facing semiconductor laser device 2, and is narrower with the decreasing distance from optical waveguide 12. The width of tapered portion 40 of optical waveguide 12 is narrower with the decreasing distance from tapered portion 30 of optical waveguide 10 and is wider with the increasing distance from tapered portion 30. A change in coupling efficiency can be suppressed. Light is transferred between optical waveguide 10 and optical waveguide 12.

Optical waveguide 10 includes first portion 32 and second portion 34. Tapered portion 30 is positioned between first portion 32 and second portion 34. Width W1 of first portion 32 is wider than width W2 of second portion 34. First portion 32 includes end portion 10a of optical waveguide 10. Since end portion 10a is provided in first portion 32 having a large width, the tolerance is improved. Second portion 34 overlaps optical waveguide 12. As shown in FIGS. 6A to 6B, light propagating through optical waveguide 10 is transferred to optical waveguide 12 at second portion 34.

Length L2 of tapered portion 30 may be, for example, 100 μm or more. As shown in FIG. 7B, when length L2 is 100 μm or more, the amount of change in coupling efficiency can be made 1 dB or less. Length L2 may be 50 μm or more, 200 μm or more, 300 μm or more, or 400 μm or more. As shown in FIG. 7B, when length L2 is about 200 μm, the amount of change in coupling efficiency is reduced to 0.5 dB or less.

Width W1 of tapered portion 30 closer to end portion 10a is equal to the width of first portion 32. Width W2 of tapered portion 30 closer to optical waveguide 12 is narrower than width W1 of tapered portion 30 closer to end portion 10a, for example, narrower than or equal to half of W1. As an example, width W1 is 8 μm and width W2 is 3 μm. By increasing width W1, the tolerance for positional displacement is improved. Tapered portion 30 has a shape such that the width varies from W1 to W2. Interference between the higher-order mode and the fundamental mode is suppressed, and the amount of change in coupling efficiency is reduced.

Since width W1 of end portion 10a of optical waveguide 10 is large, the tolerance for positional displacement with semiconductor laser device 2 is improved. Width W1 may be, for example, 6 μm or more, 7 μm or more, 8 μm or more, 9 μm or more, or 10 μm or more. The wider width W1 is, the more the higher-order modes tend to increase. In the first embodiment, since optical waveguide 10 has tapered portion 30, higher-order modes can be suppressed.

Length L1 of first portion 32 of optical waveguide 10 may be several tens of μm or more, or may be 100 μm or more. Length L1 varies depending on the accuracy of a process such as dicing. As shown in FIG. 7A, according to the first embodiment, the amount of change in coupling efficiency according to the change of the length is suppressed to be small. If length L3 from tapered portion 30 to the end portion of optical waveguide 12 is too long, optical loss may increase. Length L3 may be 10 μm or more and 10 μm or less.

As shown in FIG. 2B, spot size converter 100 includes core layer 24 and silicon layer 25. Core layer 24 has optical waveguide 10. Silicon layer 25 has optical waveguide 12 and is embedded in core layer 24. The light is made incident on optical waveguide 10 of core layer 24 and is transferred to optical waveguide 12 of silicon layer 25. By transferring the light between the two layers, the spot size of the light can be changed.

Cladding layer 26 is provided on core layer 24. Core layer 24 is formed of a dielectric material. Cladding layer 26 is formed of SiO$_2$. The refractive index of core layer 24 is higher than the refractive index of cladding layer 26. Cladding layer 26 confines light and allows light to propagate through optical waveguide 10 of core layer 24.

As shown in FIG. 2A, in spot size converter 100, the extending direction of optical waveguide 10 and the extending direction of optical waveguide 12 are parallel to each other. The extending direction in which tapered portion 30 of optical waveguide 10 extends is parallel to the extending direction in which tapered portion 40 of optical waveguide 12 extends. Light is transferred between the two optical waveguides 10 and 12 parallel to each other. A portion of optical waveguide 12 other than spot size converter 100 may not be parallel to optical waveguide 10 and may be curved as shown in FIG. 1.

Second Embodiment

Figure 9:
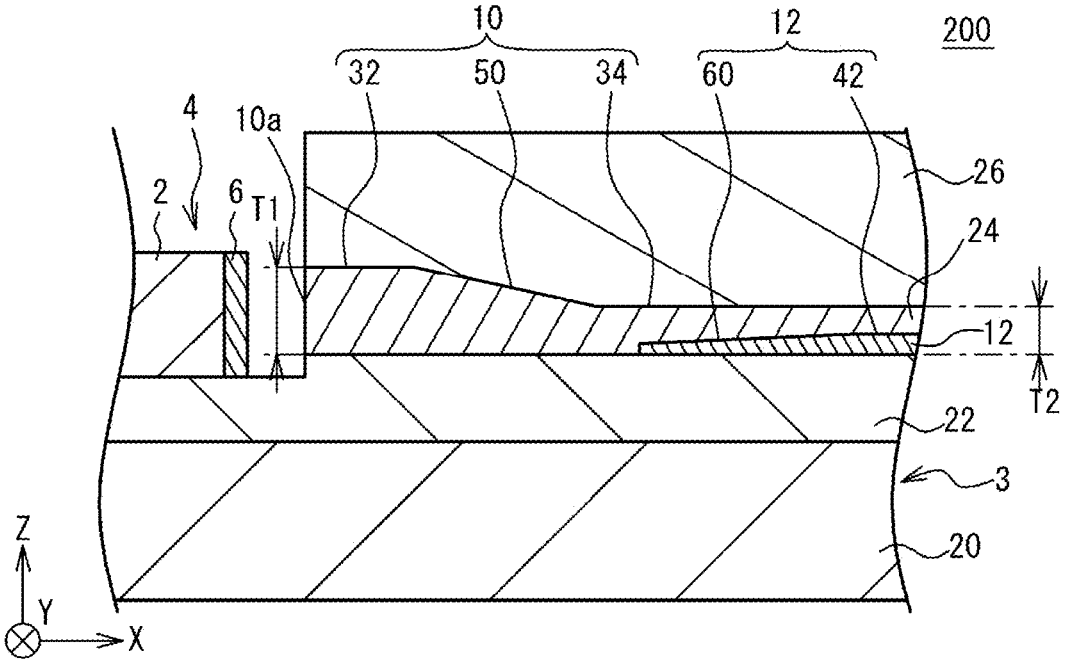
FIG. 9 is a cross-sectional view illustrating a spot size converter according to a second embodiment.

FIG. 9 is a cross-sectional view illustrating a spot size converter 200 according to a second embodiment, showing a cross-section corresponding to the cross-section of FIG. 2B. Description of the same configuration as that of the first embodiment will be omitted. As shown in FIG. 9, optical waveguide 10 has a tapered portion 50 (first tapered portion). Tapered portion 50 is positioned between first portion 32 and second portion 34. Thickness T1 of first portion 32 is larger than thickness T2 of second portion 34. The thickness of optical waveguide 10 varies along the direction in which tapered portion 50 extends. The thickness of tapered portion 50 is larger with the decreasing distance from end portion 10a and is smaller with the decreasing distance from optical waveguide 12. The thickness of tapered portion 50 varies from T1 to T2.

Optical waveguide 12 has a tapered portion 60 (second tapered portion). The thickness of optical waveguide 12 varies along the direction in which tapered portion 60 extends. The thickness of tapered portion 60 is smaller with the decreasing distance from tapered portion 50 of optical waveguide 10 and is larger with increasing distance from tapered portion 50. The width of optical waveguide 10 in the Y-axis direction may be constant. The width of optical waveguide 12 may be constant.

According to the second embodiment, since optical waveguide 10 has tapered portion 50, the interference between the higher-order mode and the fundamental mode is suppressed. A change in the coupling efficiency between optical waveguide 10 and optical waveguide 12 is suppressed. Since end portion 10a of optical waveguide 10 facing semiconductor laser device 2 has a large thickness, the tolerance for positional displacement between spot size converter 200 and semiconductor laser device 2 is improved.

In the tapered portion, the thickness of optical waveguide 10 and the thickness of optical waveguide 12 may be changed. The thickness includes width and thickness. In the first embodiment, optical waveguide 10 has tapered portion 30. The width of tapered portion 30 varies between W1 and W2. Optical waveguide 12 has tapered portion 40. The width of tapered portion 40 varies between W3 and W4. Tolerance for positional displacement in the horizontal direction (Y-axis direction) between spot size converter 100 and semiconductor laser device 2 is improved. In the second embodiment, optical waveguide 10 has tapered portion 50. The thickness of tapered portion 50 varies between T1 and T2. Optical waveguide 12 has tapered portion 60. The thickness of tapered portion 60 varies. Tolerance for positional displacement in the vertical direction (Z-axis direction) between spot size converter 200 and semiconductor laser device 2 is improved. In the tapered portion of optical waveguide 10, both width and thickness may vary. Tolerance for positional displacement is improved.

Although the embodiments of the present disclosure have been described in detail above, the present disclosure is not limited to the specific embodiments, and various modifications and changes can be made within the scope of the gist of the present disclosure described in the claims.

What is claimed is:

1. A spot size converter comprising:
   a first optical waveguide;
   a second optical waveguide;
   a first layer formed of a dielectric and including the first optical waveguide; and
   a second layer formed of silicon, embedded in the first layer and including the second optical waveguide,
   wherein the first optical waveguide has a first tapered portion,
   wherein the first tapered portion extends in a direction in which the first optical waveguide extends, and is thicker with decreasing distance from an end portion of the first optical waveguide and is thinner with decreasing distance from the second optical waveguide, wherein the second optical waveguide is separated from the first tapered portion and has a second tapered portion, and wherein the second tapered portion extends in a direction in which the second optical waveguide extends, and is thinner with decreasing distance from the first tapered portion and is thicker with increasing distance from the first tapered portion.

2. The spot size converter according to claim 1, wherein the first optical waveguide has a first portion and a second portion, wherein the first portion is thicker than the second portion, wherein the first tapered portion is positioned between the first portion and the second portion, wherein the first portion has the end portion of the first optical waveguide, and wherein the second portion overlaps the second optical waveguide.

3. The spot size converter according to claim 1, wherein a length of the first tapered portion is 100 μm or more.

4. The spot size converter according to claim 1, wherein a length of the first tapered portion is 200 μm or more.

5. The spot size converter according to claim 1, wherein a thickness of the first tapered portion closer to the second optical waveguide is smaller than or equal to half of a thickness of the first tapered portion closer to the end portion of the first optical waveguide.

6. The spot size converter according to claim 1, wherein a thickness of the end portion of the first optical waveguide is 6 μm or more.

7. The spot size converter according to claim 1, comprising:

a third layer provided over the second layer, wherein a refractive index of the first layer is higher than a refractive index of the third layer.

8. The spot size converter according to claim 1, wherein a width of the first tapered portion is wider with the decreasing distance from the end portion of the first optical waveguide and is narrower with the decreasing distance from the second optical waveguide, and wherein a width of the second tapered portion is narrower with the decreasing distance from the first tapered portion and is wider with the increasing distance from the first tapered portion.

9. The spot size converter according to claim 1, wherein a thickness of the first tapered portion is larger with the decreasing distance from the end portion of the first optical waveguide and is smaller with the decreasing distance from the second optical waveguide, and wherein a thickness of the second tapered portion is smaller with the decreasing distance from the first tapered portion and is larger with the increasing distance from the first tapered portion.

10. The spot size converter according to claim 1, wherein the direction in which the first optical waveguide extends is parallel to the direction in which the second optical waveguide extends.

* * * * *